May 20, 1930.    R. PUDELKO    1,759,491
ELECTRIC METER MECHANISM
Original Filed March 4, 1926    2 Sheets-Sheet 2

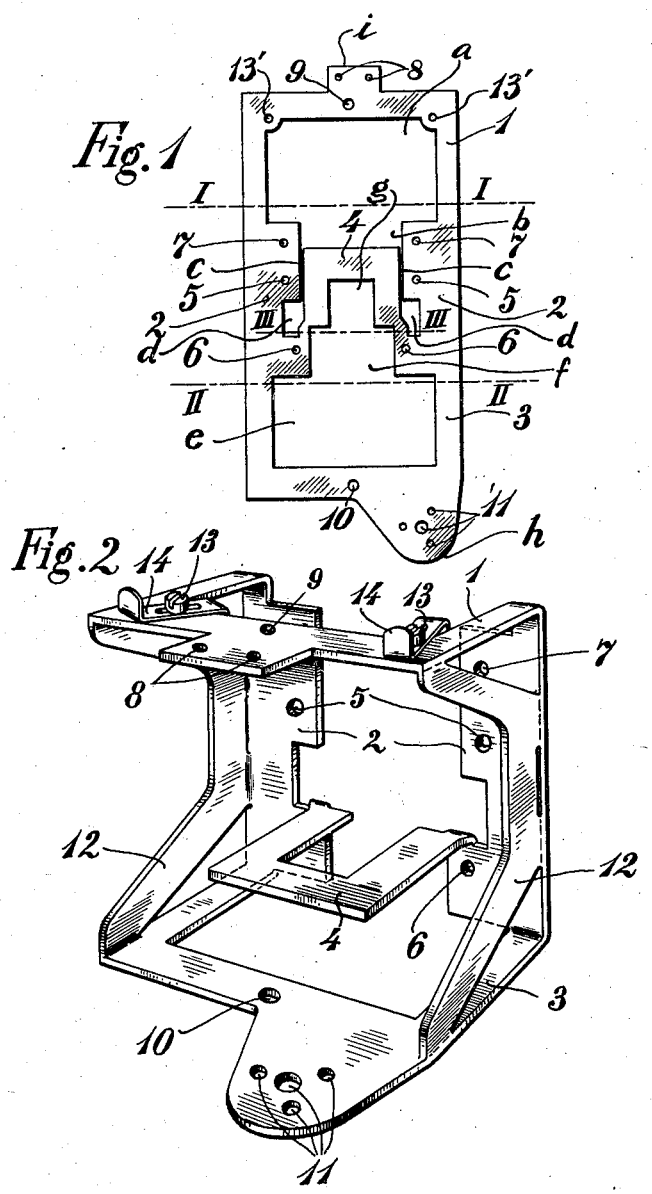

INVENTOR.
Riccard Pudelko
BY John D Morgan
ATTORNEY

Patented May 20, 1930

1,759,491

UNITED STATES PATENT OFFICE

RICCARD PUDELKO, OF ZUG, SWITZERLAND, ASSIGNOR TO LANDIS & GYR, A.-G., A JOINT-STOCK COMPANY OF SWITZERLAND

ELECTRIC METER MECHANISM

Application filed March 4, 1926, Serial No. 92,139, and in Switzerland March 10, 1925. Renewed October 7, 1929.

The invention relates to a novel and useful alternating current meter construction, and more particularly to a novel and useful frame for the active meter elements, the frame preferably having a member or members constituting a part of the active metering structure; and to a method of producing the foregoing.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 shows a blank of sheet metal, adapted to be bent or formed to constitute an embodiment of the invention;

Fig. 2 is a perspective of the sheet metal form or blank shown in Fig. 1 after it has been bent or formed to its shape as a meter element, with certain other meter parts added thereto;

Figure 3:
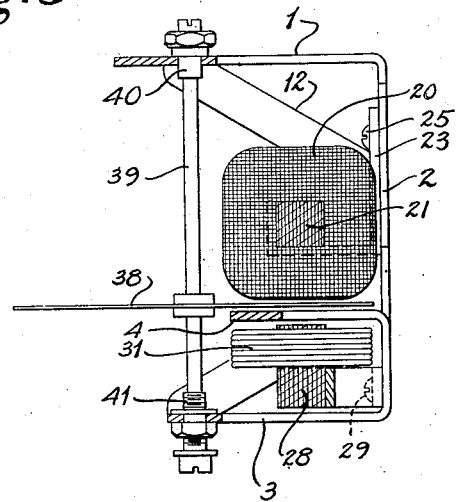
Fig. 3 is a vertical transverse section on the line 3—3 of Fig. 4, and showing the device of Fig. 2, with the remaining elements of an alternating current meter assembled therewith, certain of the parts being shown somewhat diagrammatically.

The invention is directed to providing a structure to be a constituent part of an electrical meter mechanism, comprising a frame and a portion of the active metering mechanism, which has certain characteristics and advantages, hereinafter enumerated in part, and which may also be formed of sheet metal, and is stamped and bent or struck up, as the preferable form of manufacture.

Referring now in detail to the present preferred embodiment of my invention, illustrated by way of example in the accompanying drawings the meter structure of my invention is therein exemplified as being formed primarily from a sheet of metal, although so far as concerns the broader features of the invention it could be cast or otherwise manufactured.

In Fig. 1 of the drawings, a form or blank is shown which has been punched or stamped from a sheet of metal, and is of general rectangular form externally, with projections at either end for uses and purposes to be later described. This stamped form has in the upper portion thereof in Fig 1 a large internal opening $a$, stamped out of the metal. This opening at its lower end in said figure has a narrower portion $b$, and there are two narrow cuts or slots $c$ extending downwardly from either side of the portion $b$, and terminating in two lesser openings $d$. There is thus formed between the slots $c$ a tongue 4 of metal which will be later described as to form, position and function.

In the lower part of the blank or form, as shown in Fig. 1, is another large internal opening $e$, which at the upper part thereof has a smaller portion $f$, with a smaller portion $g$ at the extreme upper part thereof, within the tongue 4, these preferably constituting a continuous open space.

In this preferred method of making and embodying the device of my invention, the blank shown in Fig. 1 is bent substantially transversely along the line I—I so that the portions at either side of the bend are substantially at right angles to each other, and the blank is likewise bent substantially along the line II—II so that the parts at either side are substantially at right angles to each other. The upper end 1 and the lower end 3 are thus permanently positioned substantially parallel to each other, and at right angles to the central and intervening part 2. An additional bend is made in the central tongue or U-shaped member 4, at the narrow lower part thereof substantially on the line III—III, whereby the U-shaped member 4 is permanently positioned at right angles to the part 2 of the frame, and parallel to, intermediate and spaced away from, the top and bottom parts 1 and 3 respectively.

Figure 4:
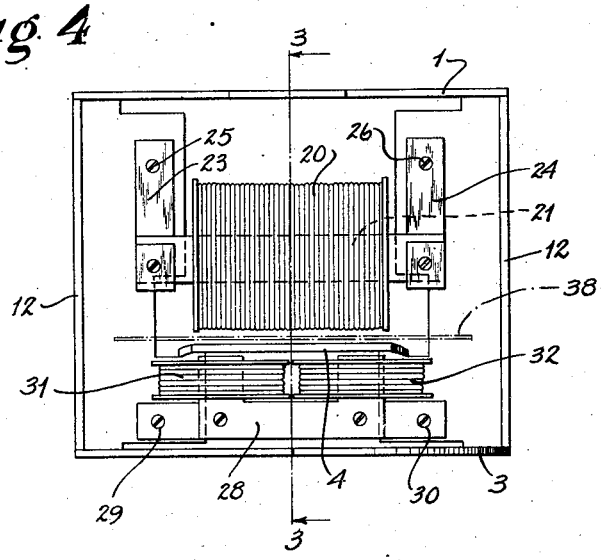
Fig. 4 is a full elevation looking at Fig. 3 from the left, but omitting the disc shaft and bearings, and showing the disc in dash and dot line.

In so far as concerns the main features of the invention the foregoing structure is sufficient, but it is preferable to add supporting and stiffening side members, to give the structure strength and rigidity. Accordingly two V-shaped members 12 are provided at either side, as shown in Figs. 2, 3 and 4. The central part of each of these frame members 12 is united at its edge with the central part 2 of the frame at its corresponding outer side edge. The outer ends of each of these side members 12 is fastened at their edges to the corresponding outer ends of the exterior edges of the parts 1 and 3, at either side thereof.

The members 12 thus constitute light, open and very strong positioning and reenforcing members for the frame proper. These frame members 12, when the device is manufactured by being stamped from sheet metal, and bent in the manner described, may be stamped out integral with the blank or form shown in Fig. 1, but for the sake of economy in sheet metal, they are preferably stamped out separately and welded to the main frame.

Means are provided in the structure already described, for attaching the various additional meter elements to the structure, in such position and relation as to utilize the part 4 as a counter pole or lag plate for the pressure coil. In this embodied form, bolt holes 5 are provided at either side of the central opening in the part 2 of the frame, for attachment of the core of the pressure coil, either directly or by means of an intervening support. As shown, the pressure coil 20 has its core 21 mounted on brackets 23 and 24, having screws or bolts 25 and 26, screwed into the holes 5 and 7. The pressure coil is thus mounted just above the projecting member 4, with clearance therebetween for the meter disc, the member 4 thereby serving as a counter pole or lag plate for the pressure coil.

The current coil or coils are mounted on the part 2 of the frame just beneath the part 4 thereof, and as shown a core 28 is fastened to the frame by means of bolt holes 6 and screw-bolts 29 and 30. This core is provided with coil windings 31 and 32, which may be of a usual type or other suitable type.

The meter disc 38 extends between the pressure coil 20 and the counter pole or lag plate 4, and is mounted on a shaft 39, the shaft having bearings 40 and 41 mounted in the apertures 9 and 10 in the upper and lower members 1 and 3, respectively, of the main frame. The bearings for the motor disc shaft may be of any standard or suitable form, provided with proper adjustments, and need not be described in detail.

The angular projection $i$ at the top of the frame in Fig. 1 provides a support upon which the register, or other recording means driven from the meter shaft 39 may be mounted, and may be fastened thereto by means including the screw-holes 8. The projection $h$, preferably provided as shown at the lower end of the frame in Fig. 1 serves as a suitable support for the brake magnet, and is provided with holes 11 to fasten the magnet thereto.

In the present embodied form, there is provided on the frame devices, such as air gap adjustments, for controlling the action of the pressure coil. As embodied, two wings or fingers 14 have screw-and-slot adjustments 13, the screws thereof being mounted in screw holes 13′ in the part $a$ of the main frame, although it will be understood that so far as the present invention is concerned these devices may be of any standard or suitable form.

The construction of my invention provides a structure of practically minimum weight and of great strength and suitability for the purposes in view. The metering elements and devices may be assembled in the frame prior to the mounting of the frame in the meter casing and this facilitates the work of assembling and adjusting, and also provides easy accessibility to all the parts during and after assembling, and for later adjustment or regulation if found desirable. The side frames add greatly to the strength and the rigidity of the mechanism, while in no material degree affecting the accessibility already referred to.

The relative position and relation of the counter pole and pressure core are furthermore conducive to favorable conditions and results with reference to the electrical properties and action of the meter. There is preferably but a single point of attachment of the meter to the case, and this is effected by means passing through screw or bolt holes 7, at either side of the internal aperture in part 2. The screws engage in the casing, or preferably into an internal member thereof, which in itself provides means for spacing the meter frame away from the casing, or additional spacing washers may be provided.

Not only does this provide very simple means for attaching and detaching the mechanism from the casing, but by reason of the unitary frame and the manner of its attachment to the casing, it is impossible to impair the action of the meter mechanism by bending or deforming the meter casing, which might be attempted with a view to damage the meter.

From all the foregoing it will be understood that a mechanism has been provided embodying the inventive features and resulting advantages set forth, together with others; and that changes may be made from the exact steps and structures described as my preferable procedure and embodiment, without departing from the principles of the invention and without sacrificing its chief advantages.

What I claim is:—

1. In an electrical meter structure, a unitary frame having a central portion and two angled end portions substantially parallel to each other, bearings for the meter disc shaft in the end portions, mountings for the coils on the intervening structure, a pressure core counter pole projecting from said central portion, and located between said end portions, reenforcing side frames fixed to the side edges of said central part and to the outer side edges of said end portions, and at either side of, but spaced away from, said counter pole.

2. In an electrical meter structure, a stamped out unitary plate having a relatively large internal aperture toward one end thereof, and a relatively large internal aperture toward the other end thereof, and an intervening relatively narrow tongue-like member formed by said apertures, and adapted to be bent at substantially right angles to constitute a counter pole, the portions of the plate at either side thereof, and spaced away therefrom, being adapted to be bent at right angles and into substantial parallelism, to constitute supports of the meter disc spindle bearings.

3. In an electrical meter structure, a stamped out unitary plate having a relatively large internal aperture toward one end thereof, and a relatively large internal aperture toward the other end thereof, and an intervening relatively narrow tongue-like member formed by said apertures, and adapted to be bent at substantially right angles to constitute a counter pole, the portions of the plate at either side thereof, and spaced away therefrom, being adapted to be bent at right angles and into substantial parallelism, to constitute supports of the meter disc spindle bearings, and having apertures in said respective end portions adapted to constitute a mounting for the meter disc spindle bearings.

4. In an electric meter structure, a meter frame adapted to be mounted within a meter casing, comprising a unitary flat plate bent transversely and parallelly, to form an intermediate flat back part and unitary projecting top and bottom parts projecting from the back in parallelism, said frame having openings at said two bends, the respective openings occupying the greater part of the area of the plate at the bends and extending into both the back part and the corresponding bent part of the frame for a relatively large part of their extent and a reenforcing member at either side fastened to the back and both the projecting top and bottom parts and being centrally recessed so as to leave the meter mechanism readily accessible from either side.

5. In an electric meter structure, a meter frame adapted to be mounted within a meter casing, comprising a unitary flat plate bent transversely and parallelly, to form an intermediate flat back part and unitary projecting top and bottom parts projecting from the back in parallelism, said frame having openings at said two bends, the respective openings occupying the greater part of the area of the plate at the bends and extending into both the back part and the corresponding bent part of the frame for a relatively large part of their extent and a median integral portion projecting from said back part to constitute a counter pole.

6. In an electric meter structure, a stamped-out unitary plate having a relatively large internal aperture toward one end thereof, and a relatively large internal aperture toward the other end thereof, the ends of said plate being bent forwardly to constitute supports of the meter disc spindle bearings, and a centrally-disposed tongue-like member forming part of said plate and bent forwardly at substantially right angles and forming a counter-pole.

7. In an electric meter structure, a meter frame adapted to be mounted in a meter casing, comprising a unitary flat plate bent transversely and forwardly to form an intermediate flat back part and unitary top and bottom parts projecting from the back, said frame having relatively large openings at said two bends and extending into both the back part and the bent portions of the frame, a tongue-like member bent forwardly from the back part, the sides of the frame being relatively open so as to leave the meter mechanism readily accessible from either side.

8. In an electric meter structure, a unitary frame having a central portion and two angled end portions substantially parallel to each other, bearings for the meter disc shaft in the end portions, mountings for the coils and cores on the intervening structure, and a counterpole projecting from said central portion, and located between said end portions.

9. In an electrical meter structure, a stamped out unitary plate having a relatively large internal aperture toward one end thereof, and a relatively large internal aperture toward the other end thereof, the end portions of said plate being bent at right angles to the intermediate portion of the plate and in substantial parallelism with each other and constituting supports for the meter disc spindle bearings, and a counterpole attached to and extending at right angles to the intermediate portion of the plate.

10. In an electric meter structure, a stamped out unitary plate having a relatively large internal aperture toward one end thereof, and a relatively large internal aperture toward the other end thereof, the ends of said plate being bent forwardly to constitute supports for the meter disc spindle bearings, and a centrally-disposed tongue-like member attached to said plate and forwardly extending at substantially right angles to the intermediate portions of said plate and forming a counterpole.

In testimony whereof, I have signed my name to this specification.

RICCARD PUDELKO.